US005237320A

United States Patent [19]
Sato et al.

[11] Patent Number: 5,237,320
[45] Date of Patent: Aug. 17, 1993

[54] RADIO PAGING SYSTEM WITH DIFFERENT TRANSMISSION SPEEDS AND RECEIVER THEREFOR

[75] Inventors: Toshifumi Sato; Takashi Oyagi, both of Tokyo, Japan

[73] Assignee: Nec Corporation, Japan

[21] Appl. No.: 682,846

[22] Filed: Apr. 4, 1991

Related U.S. Application Data

[63] Continuation of Ser. No. 541,094, Jun. 20, 1990, abandoned, which is a continuation of Ser. No. 303,107, Jan. 25, 1989, abandoned, which is a continuation of Ser. No. 102,048, Sep. 29, 1987, abandoned.

[30] Foreign Application Priority Data

Sep. 30, 1986 [JP] Japan .................. 61-232577

[51] Int. Cl.$^5$ .................................................. G08B 5/22
[52] U.S. Cl. ...................................... 340/825.44; 371/42
[58] Field of Search ....................... 340/825.44, 825.47, 340/825.48, 825.52; 375/28; 370/84, 85.1, 94.2; 341/81; 455/38; 333/167; 371/41–46

[56] References Cited

U.S. PATENT DOCUMENTS

| | | | |
|---|---|---|---|
| 3,932,824 | 1/1976 | Wycoff | 333/167 |
| 4,312,070 | 1/1982 | Coombes et al. | 371/42 X |
| 4,313,033 | 1/1982 | Walker et al. | 375/28 X |
| 4,369,443 | 1/1983 | Giallanza et al. | 340/825.47 |
| 4,394,642 | 7/1983 | Currie et al. | 341/81 |
| 4,427,980 | 1/1984 | Fennell et al. | 340/825.52 |
| 4,644,345 | 2/1987 | Wycoff | 340/825.48 |

Primary Examiner—Ulysses Weldon
Attorney, Agent, or Firm—Ostrolenk, Faber, Gerb & Soffen

[57] ABSTRACT

A paging system includes a receiver adapted for receiving paging signals at a fixed bit rate of N·R where N is an integer and R is a basic bit rate. A transmitter transmits at the N·R bit rate, N being adjustable to accommodate any signal for any particular receiver. The transmitter bit rate is selected according to serial data received from a telephone exchange with a message to be transmitted. The transmitter has a degree indicating system producing a first signal representative of a degree N when it receives a signal which is representative of a bit rate N·R. It has interleaving means for N-degree interleaving of input data having the bit rate N·R, in response to the first signal, to produce an interleaved signal; and transmitting means for transmitting said interleaved signal. The receiver has means for receiving a signal whose bit rate is N·R bit rate indicating means for outputting a first signal which is representative of N; de-interleaving means for N-degree de-interleaving the received signal, in response to the first signal, to produce a de-interleaved signal; and deciding means for deciding whether or not a paging address number, which may be included in the de-interleaved signal, is assigned to the receiver. Alarm means may produce an audible alarm in response to an output of the deciding means.

19 Claims, 8 Drawing Sheets

RADIO PAGING SYSTEM WITH DIFFERENT TRANSMISSION SPEEDS AND RECEIVER THEREFOR

This is a continuation of application Ser. No. 07/541,094 filed on Jun. 20, 1990, now abandoned, which is a continuation of application Ser. No. 07/303,107, filed on Jan. 25, 1989, now abandoned, which is continuation of application Ser. No. 07/102,048, filed on Sep. 29, 1987, now abandoned.

BACKGROUND OF THE INVENTION

The present invention relates to a radio paging system and, more particularly, to a paging system which offers a service at several different bit rates and a receiver for the same.

Current trend in the paging systems is toward a higher bit rate, which would accommodate the increase in traffic as well as improve the effective use of the available frequency allocations. A method heretofore proposed for increasing the bit rate of a paging signal consists in simply multiplying the clock frequency by N to make the bit rate N-fold. This kind of method, however, has the following problems.

(1) Receivers of different bit rates cannot coexist in a single paging system; and (2) While each codeword usually undergoes error correcting coding, an increase in bit rate results in a decrease in the time length of one codeword and, therefore, the signal becomes susceptible to burst errors which frequently occur on radio channels due to fading.

Another prior art implementation for providing higher bit rates is changing the bit rate depending upon the kind of information (e.g. 300 bits per second for an address and 600 bits per second for a message), as disclosed in, for example, U.S. Pat. No. 4,642,632 which is assigned to the applicant of the instant application and issued Feb. 10, 1987 to Ohyagi et al. Such an implementation, however, is incapable of changing the bit rate depending upon the particular traffic or messages to be transmitted because the bit rate for any one kind of information is fixed (e.g. 300 bits per second for an address without exception).

SUMMARY OF THE INVENTION

It is, therefore, an object of the present invention to provide a radio paging system which accommodates receivers employing different bit rates.

It is another object of the present invention to provide a radio paging system which is resistive to burst errors even if the bit rate is increased.

It is another object of the present invention to provide a receiver for the above-described radio paging system.

In accordance with the present invention, there is provided a transmitter for a paging system comprising degree indicating means for producing a first signal representative of a degree N in response to a signal which is representative of a bit rate N·R, where N is a positive integer and R is a basic bit rate, interleaving means for N-degree interleaving input data having the bit rate N·R in response to the first signal to produce an interleaved signal, and transmitting means for transmitting the interleaved signal.

A paging receiver of the present invention comprises receiving means for receiving a signal whose bit rate is N·R where N is a positive integer and R is a basic bit rate; bit rate indicating means for outputting a first signal which is representative of the N; de-interleaving means for N-degree de-interleaving the received signal in response to the first signal to produce a de-interleaved signal; and deciding means for deciding whether or not a paging address number included in the de-interleaved signal is an address number which is assigned to the receiver.

Specifically, the interleave and deinterleave degree is varied in proportion to the bit rate, i.e., second-degree de-interleave is performed when the bit rate is 2R (N=2), third-degree de-interleave is performed when the bit rate is 3R (N=3), and N-degree de-interleave is performed when the bit rate is N·R.

BRIEF DESCRIPTION OF THE DRAWINGS

The above and other objects, features and advantages of the present invention will become more apparent from the following detailed description taken with the accompanying drawings in which.

DETAILED DESCRIPTION OF THE EMBODIMENTS

Figure 1:
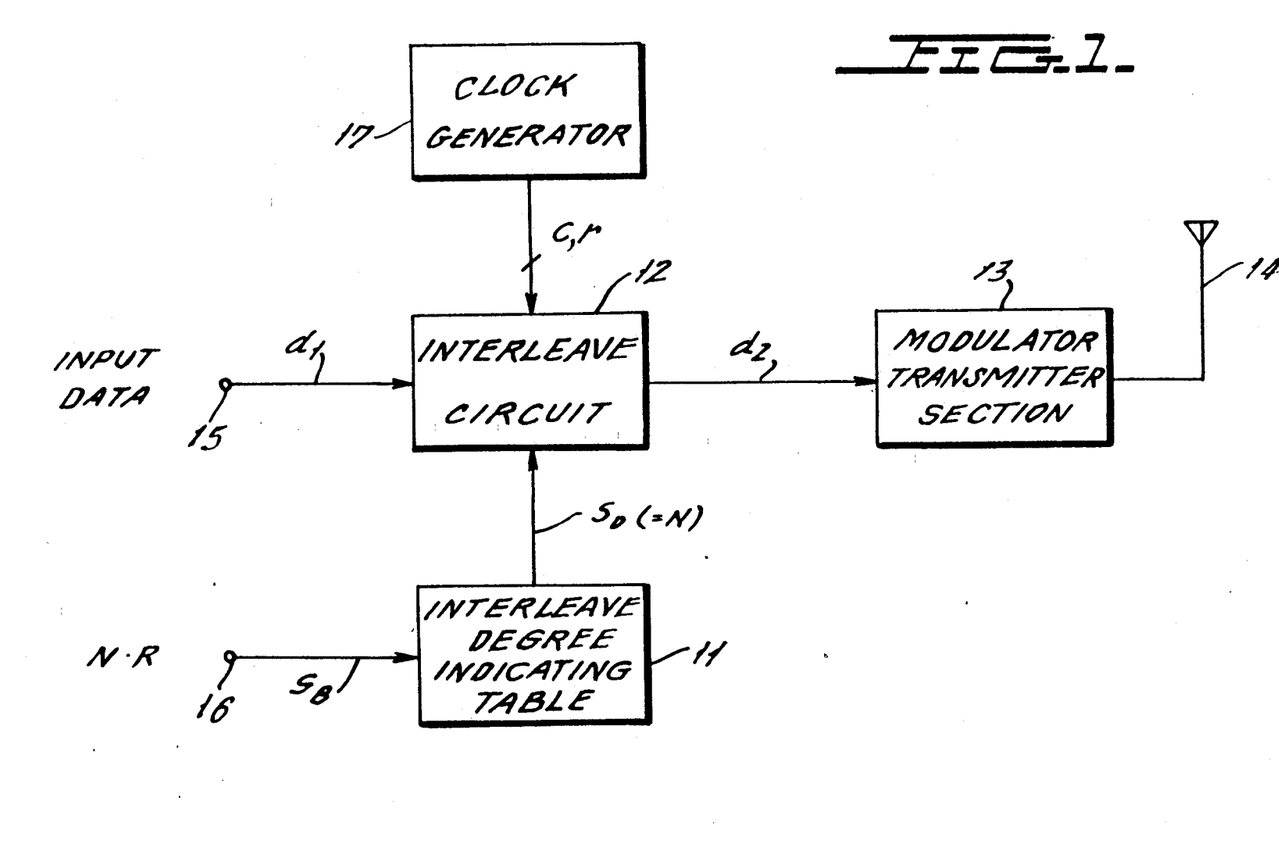
FIG. 1 is a schematic block diagram showing a transmitting side of a radio paging system embodying the present invention.

Referring to FIG. 1, a transmitting side of a radio paging system in accordance with the present invention is shown and includes an interleave-degree indicating table 11. A signal $S_B$ for designating a particular bit rate of transmit data is applied through a terminal 16 to the interleave-degree indicating table 11 which then produces a signal $S_D$ for indicating an interleave degree proportional to the designated bit rate. For example, when the designated bit rate is N·R (N=1, 2, 4, 8, ...), the table 11 produces an interleave degree indicating signal $S_D$ of N. Here, R is representative of a basic bit rate which is to be used while interleave is not performed. The output $S_D$ of the table 11 is fed to an interleave circuit 12. Also fed to the interleave circuit 12 are a clock (c) and a reset (r) pulse which are generated by a clock generator 17. In response, the interleave circuit 12 applies N-degree interleave to input data $d_1$ which come in through a terminal 15, the resulting signal $d_2$ being delivered to a modulator and transmitter section 13. This section 13 modulates a carrier wave with the signal $d_2$ by, for example, the frequency shift keying (FSK) principle and, then, transmits it through an antenna 14.

The signal $S_B$ indicating the bit rate N·R may be serial data which is fed from a telephone exchange. In such a case, the interleave-degree indicating table 11 may be implemented with a serial-to-parallel (S/P) converter for converting the serial data into parallel data, and a read-only memory (ROM) for producing a signal $S_D$ indicating the interleave degree data N addressed by the parallel data.

Figure 2:
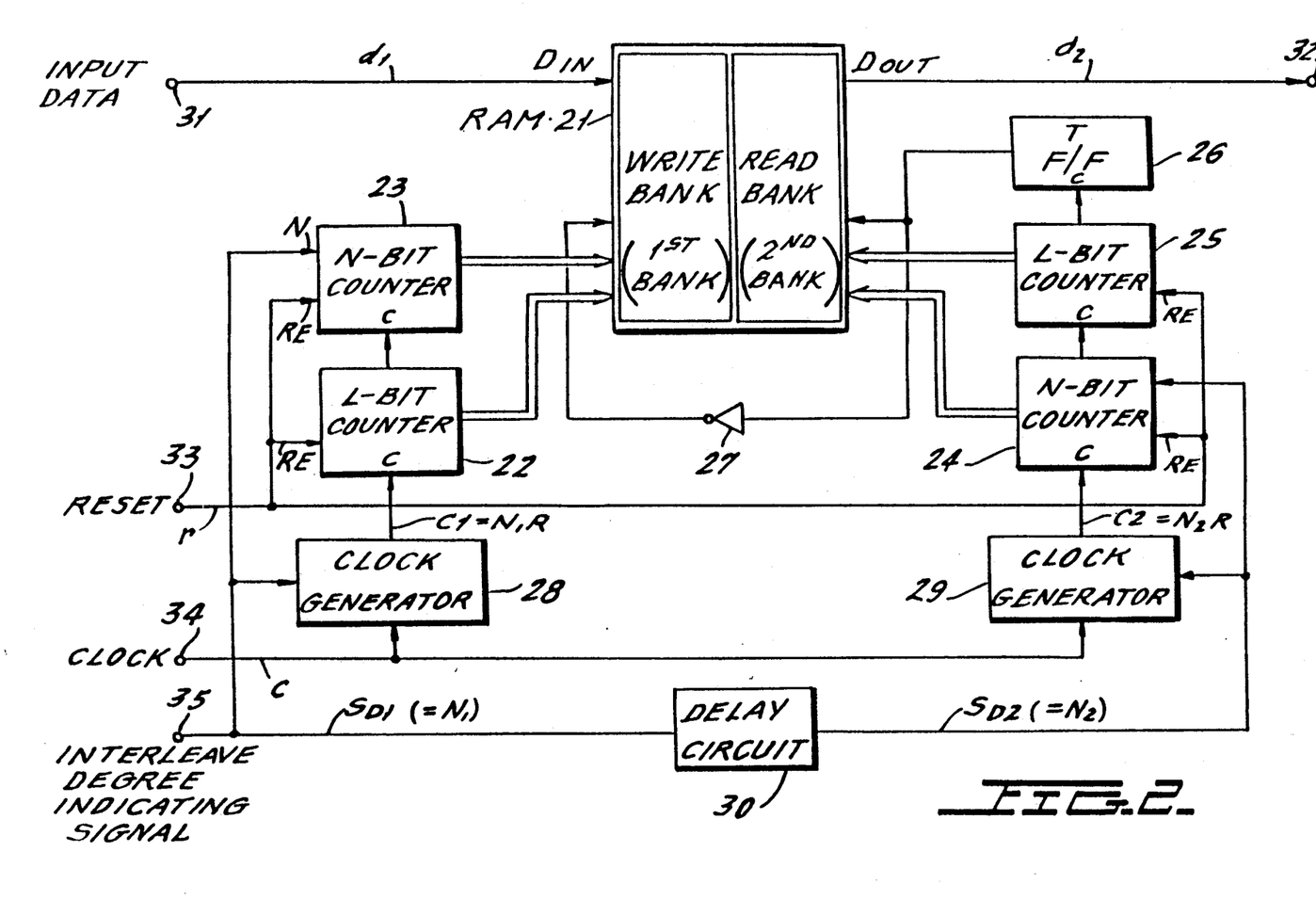
FIG. 2 is a block diagram showing a specific construction of an interleave circuit which is included in the system of FIG. 1.

Referring to FIG. 2, the interleave circuit 12 is shown in detail. As shown, the interleave circuit 12 includes a random access memory (RAM) 21, N-bit counters 23 and 24, L-bit counters 22 and 25, a T flip-flop (F/F) 26, an inverter 27, clock generators 28 and 29, and a delay circuit 30. Here, L is representative of the length of a codeword to be interleaved. The input data $d_1$ applied to an input terminal 31 are sequentially written in those memory areas of the RAM 21 which are specified by addresses which are in turn designated by the L-bit counter 22 and N-bit counter 23. The output data $d_2$ are sequentially read out of those areas of the RAM 21 which are designated by the addresses which are in turn designated by the L-bit counter 25 and N-bit counter 24, the data $d_2$ being applied to an output terminal 32. The RAM 21 is divided into two discrete banks one of which is used for read-out while the other is used for write-in. Specifically, first and second memory banks are alternately selected to a write-in and a read-out mode on an interleave block basis by the T F/F 26 and inverter 27.

The clock generators 28 and 29 generate, respectively, clocks c1 and c2 (=$N_1$·R and $N_2$·R) which are proportional to the interleave degrees $N_1$ and $N_2$, respectively. The delay circuit 30 serves to delay the input $S_{D1}$ indicating $N_1$ by one interleave block, producing a signal $S_{D2}$ indicating the interleave degree $N_2$ of output data $d_2$.

The operation of the circuit shown in FIG. 2 will be described with reference to FIGS. 3A to 3D and 4. In the figures, L is representative of the codeword length of a paging signal, and one interleave block length is assumed to be N×L. Further, ($a_{11}$, $a_{12}$, ..., $a_{1L}$), ($a_{21}$, $a_{22}$, ..., $a_{2L}$), ($b_{21}$, $b_{22}$, ..., $b_{2L}$) each are a code word of a paging signal. As shown in FIG. 4, assume that the transmit data $d_1$ are different in bit rate from one interleave block to another, each interleave block having a fixed length. The interleave degree is proportional to the bit rate. While the interleave degree $N_1$ is adapted for writing data $d_1$ in the RAM 21, the interleave degree $N_2$ is an interleave degree which occurs one block after the interleave degree $N_1$ and is adapted for reading data $d_2$ out of the RAM 21. Clocks c1 and c2 have, respectively, frequencies $N_1$·R and $N_2$·R which are proportional to the interleave frequencies $N_1$ and $N_2$, respectively. A reset signal $\gamma$ is applied to a terminal 33, FIG. 2, at the head of an interleave block as occasion demands, in order to match in phase the write-in counters 22 and 23 and the read-out counters 24 and 25.

Figure 3A:
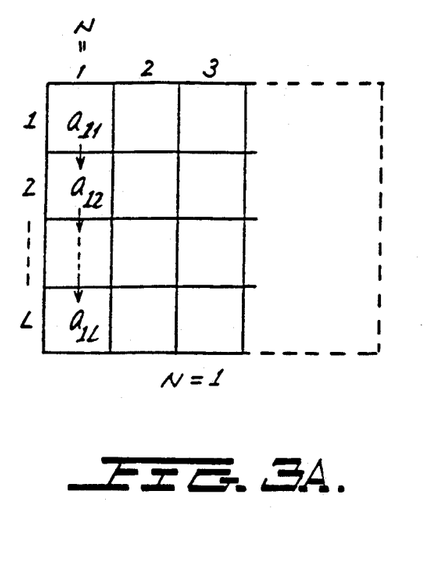
FIGS. 3A to 3D are views each showing a sequence for designating addresses of a random access memory (RAM) as shown in FIG. 2.
Figure 3B:
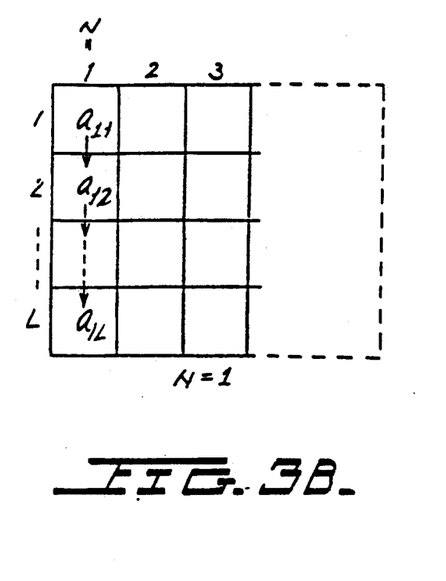
Figure 3C:
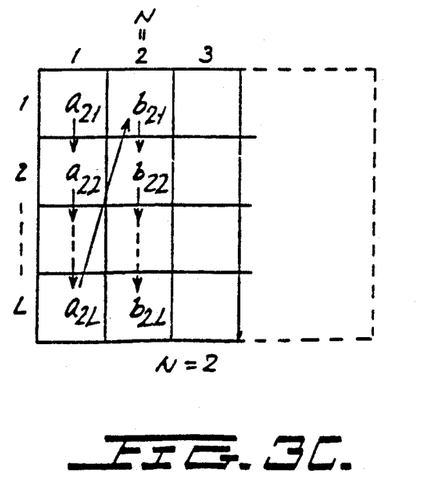
Figure 3D:
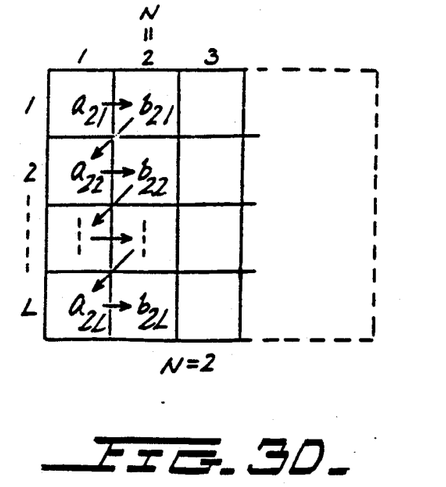
Figure 4:
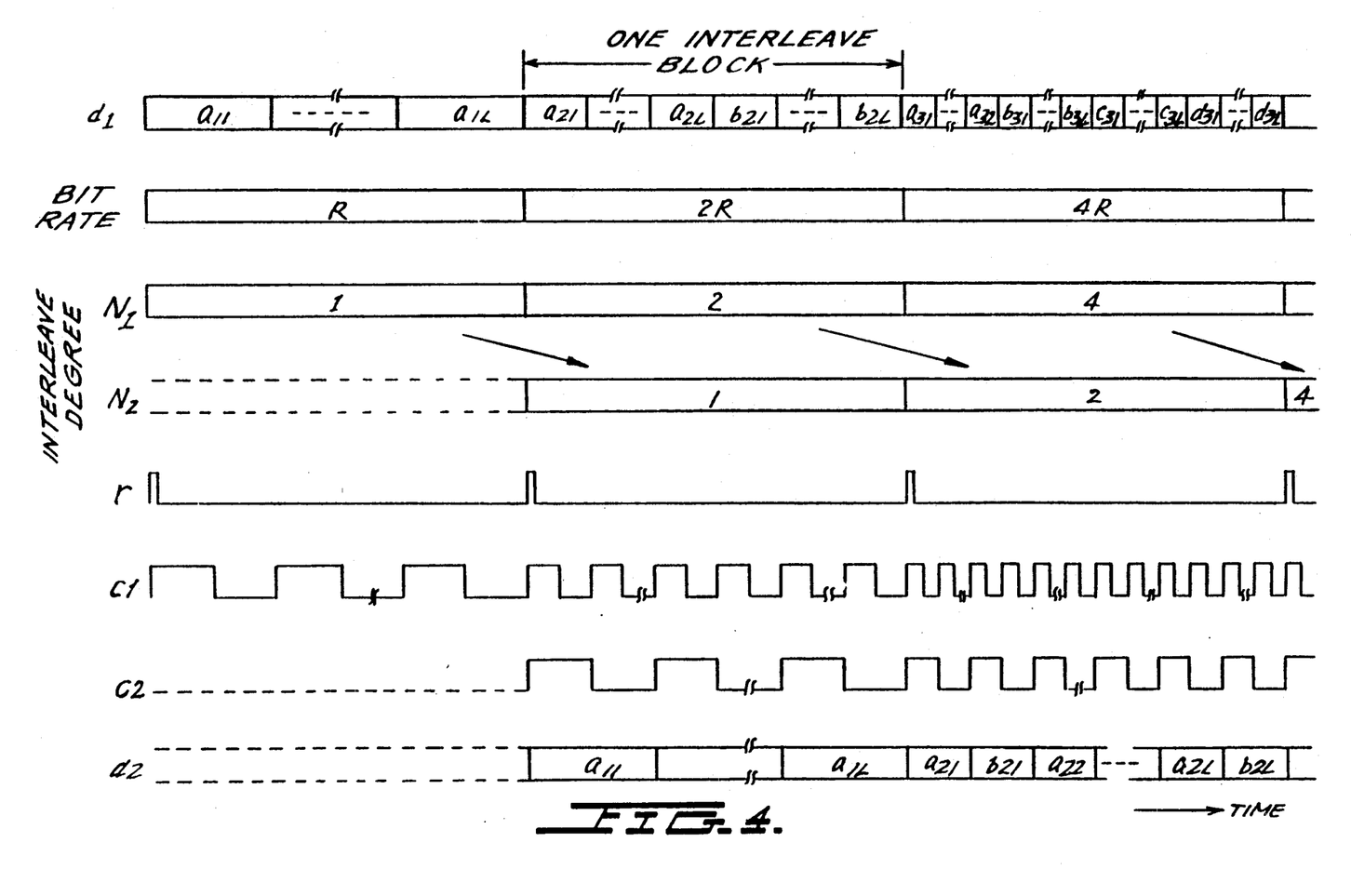
FIG. 4 is a timing chart demonstrating the operation of the interleave circuit of FIG. 2.

The input data $d_1$ are written in those memory areas of the RAM 21 which are designated by the addresses as specified by the L-bit and N-bit counters 22 and 23, respectively, in either one of the sequences shown in FIGS. 3A and 3C. Specifically, FIG. 3A shows a write-in order for the interleave degree of 1; the input data are written in the sequence of $a_{11}$, $a_{12}$, ..., $a_{1L}$. FIG. 3C shows a write-in order for the interleave degree of 2; the input data are written in the sequence of $a_{21}$, $a_{22}$, ..., $a_{2L}$ and, then, $b_{21}$, $b_{22}$, ..., $b_{2L}$. On the other hand, the output data $d_2$ are read out of those memory areas of the RAM 21 which are designated by the addresses as specified by the N-bit and L-bit counters 24 and 25, respectively, in the order shown in FIG. 3B or 3D. Specifically, FIG. 3B shows a read-out order corresponding to the interleave degree of 1; the data are read out in the same sequence as they are written in. FIG. 3D shows a read-out order corresponding to the interleave degree of 2; the data are read out in the sequence of $a_{21}$, $b_{21}$, $a_{22}$, $b_{22}$, ..., $a_{2L}$, $b_{2L}$. As a result, as shown at the bottom of FIG. 4, the transmit data $d_2$ are produced interleaved at the interleave degree which is proportional to the bit rate.

Figure 5:
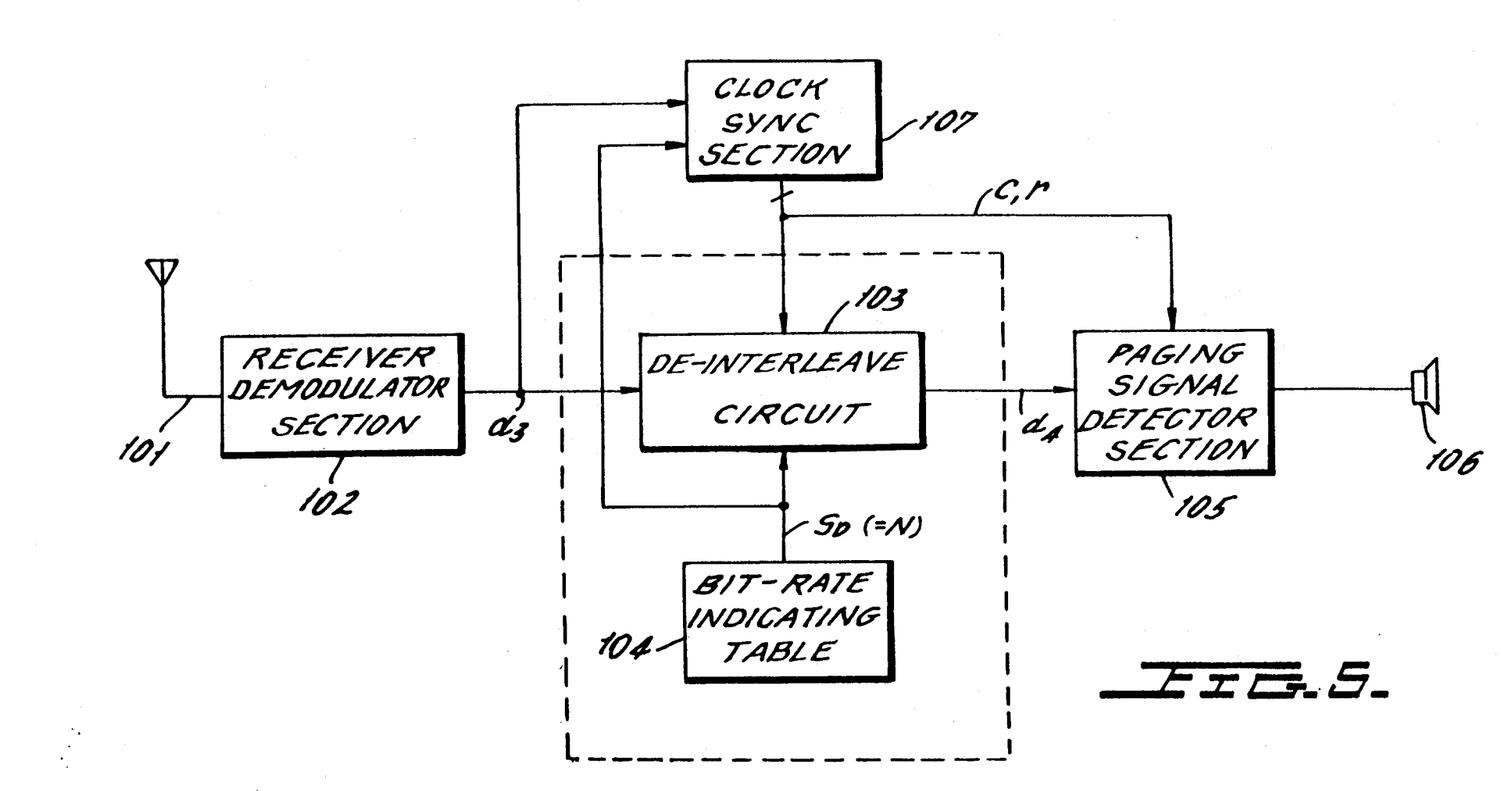
FIG. 5 is a schematic block diagram showing a receiver of the radio paging system in accordance with the present invention.

Referring to FIG. 5, a receiver of the paging system in accordance with the present invention is shown. As shown, the receiver includes an antenna 101 and a receiver and demodulator section 102 which receives and demodulates a modulated carrier wave coming in through the antenna 101 to produce a demodulated signal $d_3$. The carrier wave may be FSK modulated. A de-interleave circuit, or N-degree de-interleave means, designated 103, N-degree de-interleaves the demodulated signal $d_3$ in accordance with a bit rate (N·R) which is specified by a bit-rate indicating table, or bit-rate indicating means, 104. It is to be noted that data indicating the degree N are stored in the table 104 beforehand. A paging signal detector section 105 energizes a speaker or like annunciating means 106 when it has detected a paging signal of from the receiver out of a de-interleaved output $d_4$ of the de-interleave circuit 103. Further, a clock sync section 107 functions to produce a clock c and a reset pulse $\gamma$ which are synchronous to the demodulated signal $d_3$, at the bit rate specified by the bit-rate indicating table 104.

Figure 6:
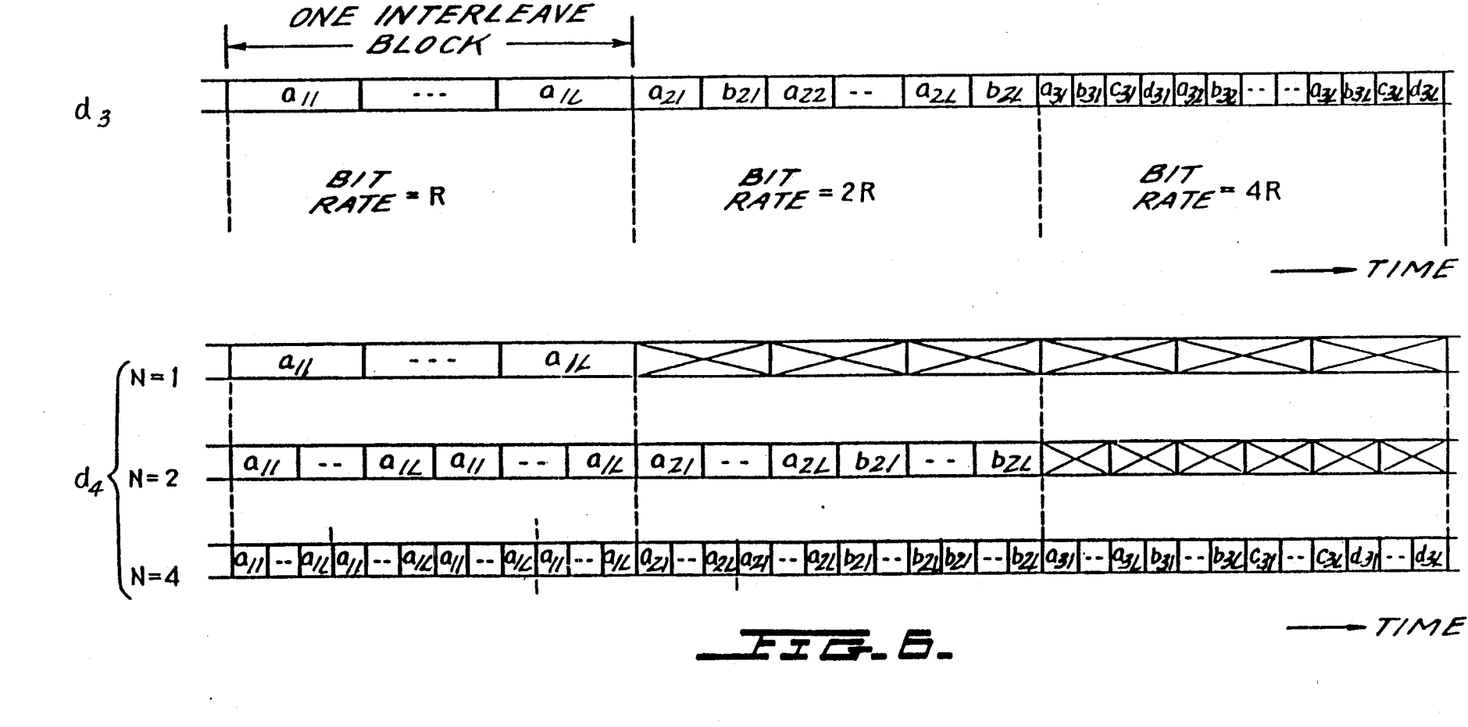
FIG. 6 is a timing chart representative of the operation of the circuit shown in FIG. 5.

In FIG. 6, $d_3$ and $d_4$ are representative of, respectively, the demodulated signal $d_3$ and the de-interleaved signal $d_4$ as shown in FIG. 5, N being assumed to be 1, 2 and 4. The codeword length of a paging signal is assumed to be L and the interleave block length, N×L. Also, ($a_{11}$, $a_{12}$, ..., $a_{1L}$), ($a_{21}$, $a_{22}$, ..., $a_{2L}$) and so on each represents a codeword of a paging signal.

Figure 7:
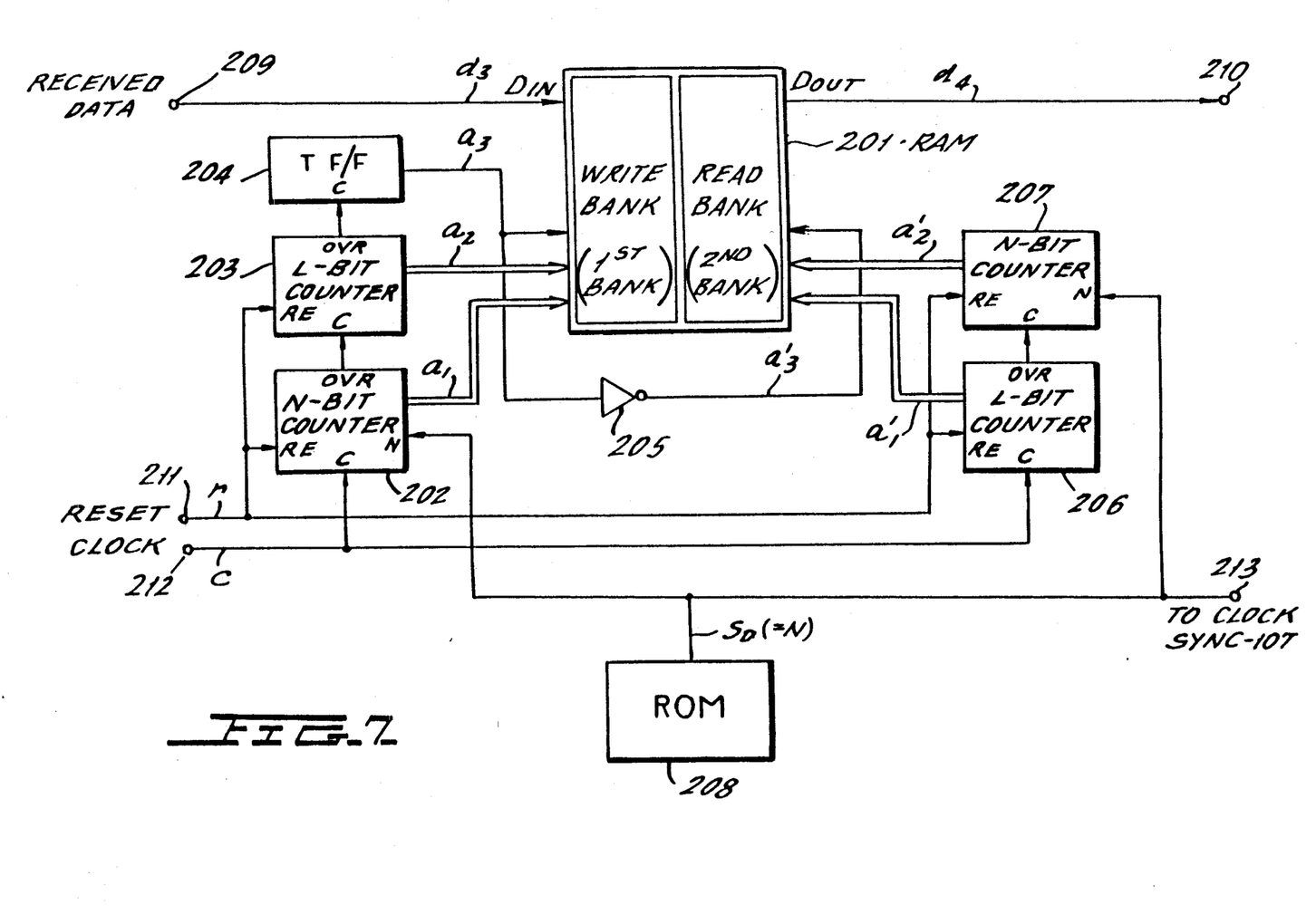
FIG. 7 is a block diagram showing a specific construction of a de-interleave circuit which is built in the receiver of FIG. 5.

Referring to FIG. 7, a specific construction of the bit rate designating means 104 and N-degree deinterleave means 103 of FIG. 5 is shown in a block diagram. In the figure, there is shown a RAM 201 having a data input terminal $D_{IN}$, a data output terminal $D_{OUT}$, an input address input terminal $A_{IN}$, and an output address input terminal $A_{OUT}$. Assuming that the codeword length of the paging signal is L, the interleave degree is N, and the interleave block length is N×L, there are provided L-bit counters 203 and 206, N-bit counters 202 and 207, and a T F/F 204. In the various sections shown in FIG. 7, C, RE, N and OVR stand for, respectively, a clock input terminal, a reset input terminal, a frequency division number (N) input terminal, and an overflow output terminal. The reference numeral 205 designates an inverter. The circuit elements 201 to 207 described so far constitute the N-degree de-interleaving means.

A ROM 208 which corresponds to the bit rate indicating table 104 of FIG. 5 is adapted to designate a bit rate (N·R) and produces a signal $S_D$ indicating a value N. Here, the basic bit rate R is assumed to be determined beforehand.

The input address ($A_{IN}$) of the RAM 201 is designated by the N-bit counter 202, L-bit counter 203 and T F/F 204. Assuming that the output signals of the counters 202 and 203 and T F/F 204 are respectively $a_1$, $a_2$ and $a_3$ ($a_1$=0 to (N−1), $a_2$=0 to (L−1), $a_3$=0 or 1), the input address ($A_{IN}$) is expressed as:

$$A_{IN} = a_3 \cdot L \cdot N + a_2 \cdot N + a_1$$

Likewise, the output address ($A_{OUT}$) is designated by the L-bit counter 206, N-bit counter 207 and inverter 205. Assuming that the output signals of the L-bit counter 206, N-bit counter 207 and inverter 205 are, respectively, $a'_1$, $a'_2$ and $a'_3$ ($a'_1=0$ to $(L-1)$, $a'_2=0$ to $(N-1)$, $a'_3=0$ or 1), the output address ($A_{OUT}$) is given by:

$$A_{OUT} = a'_3 \cdot L \cdot N + a'_2 \cdot L + a'_1$$

where $a'_3$ is an inverted version of $a_3$, i.e., when $a_3$ is 0, $a'_3$ is 1 while, when $a_3$ is 1, $a'_3$ is 0.

Figure 8:
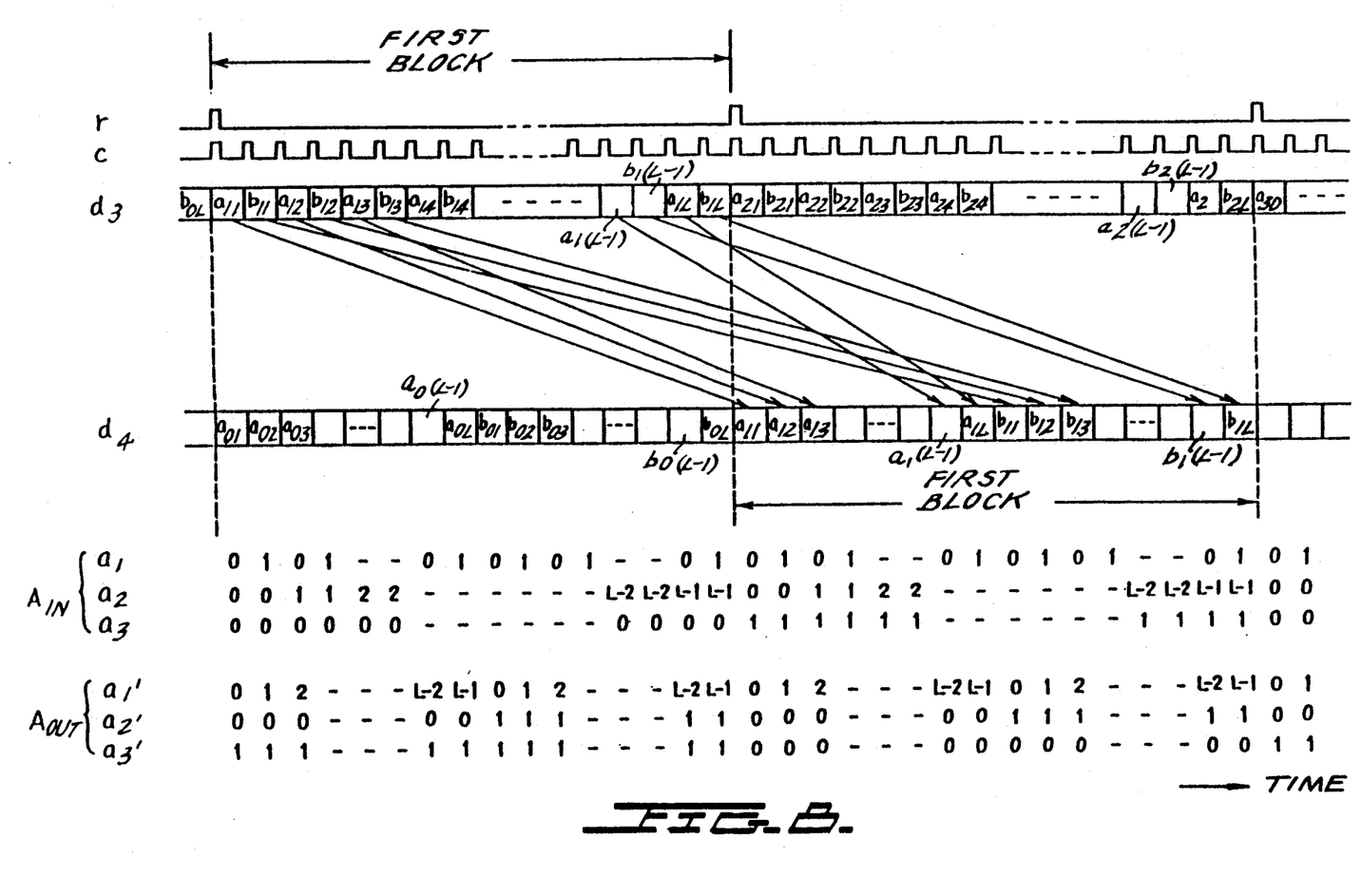
FIG. 8 is a timing chart representative of the operation of the de-interleave circuit shown in FIG. 7.

Hence, the data applied to the RAM 201 are N-degree deinterleaved and, then, outputted by the RAM 201. Specifically, when N is 2, the data which are inputted in the sequence of $a_{11}, b_{11}, a_{12}, b_{12}, a_{13}, b_{13}, \ldots, a_{1L}, b_{1L}, \ldots$ are outputted in the sequence of $a_{11}, a_{12}, a_{13}, \ldots, a_{1L}, b_{11}, b_{12}, b_{13}, \ldots, b_{1L}, \ldots$, as shown in FIG. 8. It is to be noted that one block of delay occurs because RAM 201 has two discrete banks, that is, a first memory bank and a second memory bank. The first and second memory banks are alternately selected to a write-in and a read-out mode on a de-interleave block basis by the T F/F 204 and inverter 205. Contrary to the interleaving circuit (FIG. 2), however, no delay circuit is required because a bit rate of N R is fixed for the receiver.

In summary, it will be seen that in accordance with the present invention one paging system can accommodate receivers of different bit rates since de-interleave of a degree which is proportional to a bit rate (N·R) is performed, allowing a bit rate which matches with a transmitting particular message to be selected. Further, because the codeword length (time length) of a paging signal remains constant within the range of time lag of 1/R with no regard to the bit rate, burst errors of substantially the same length, which frequently occur on a radio channel due to fading, can be corrected by the same error correcting code with no regard to the bit rate. This solves the problem particular to the prior art system that an increase in bit rate aggravates the susceptibility to burst errors.

What is claimed is:

1. A transmitter for a paging system, comprising:
   means for producing a first signal representative of an amount N of interleaving in response to a signal which is representative of a bit rate N·R, where N is a positive integer and R is a basic bit rate;
   interleaving means for interleaving input data having the bit rate N·R in response to said first signal to produce an interleaved signal, the amount of interleaving being equal to N; and
   transmitting means for transmitting said interleaved signal.

2. A transmitter in accordance with claim 1, wherein said transmitting means comprises means for frequency shift keying (FSK) modulating a carrier wave with said interleaved signal.

3. A transmitter in accordance with claim 1, wherein said interleaving means comprises:
   a first memory bank and a second memory bank;
   selecting means for selecting said first and second memory banks to a write-in and a read-out mode alternately, for each interleave block of said input data;
   first address outputting means for outputting a first address in direct response to said first signal;
   delaying means for delaying said first signal by one interleave block of said input data;
   second address outputting means for outputting a second address, which is produced by N-degree interleaving said first address, in response to an output of said delaying means;
   memory means comprising said first and second memory banks, in which said input data is written in any one of said first and second memory banks which corresponds to said first address; and
   said interleaved signal is read out of any one of said first and second memory banks which corresponds to said second address.

4. A transmitter in accordance with claim 3, wherein said memory means comprises a random access memory.

5. A transmitter in accordance with claim 3 wherein said interleave block has a length of N×L where L is a length which constitutes one frame of said input data at said basic bit rate, each of said first and second address outputting means comprising an N-bit counter and an L-bit counter.

6. A transmitter in accordance with claim 3, wherein said selecting means comprises a T-type flip-flop and inverter.

7. A receiver for a paging system, comprising:
   receiving means for receiving a signal containing input data whose bit rate is N·R where N is a positive integer representative of the amount of interleaving and R is a basic bit rate;
   bit rate indicating means for outputting a first signal which is representative of N;
   de-interleaving means for de-interleaving the received signal in response to said first signal to produce a de-interleaved signal, the amount of de-interleaving being equal to N; and
   deciding means for deciding whether or not a paging address number included in said de-interleaved signal is an address number which is assigned to said receiver.

8. A receiver in accordance with claim 7, further comprising alarm means for producing an audible alarm in response to an output of said deciding means.

9. A receiver in accordance with claim 7, wherein said de-interleaving means comprises:
   a first memory bank and a second memory bank;
   selecting means for selecting said first and second memory banks to a write-in and a read-out mode alternately, for each interleave block of the input data;
   first address outputting means for outputting a first address in direct response to said first signal;
   delaying means for delaying said first signal by one interleave block of said input data;
   second address outputting means for outputting a second address, which is produced by N-degree de-interleaving said first address, in response to an output of said delaying means; and
   memory means comprising said first and second memory banks, in which said received data is written in any one of said first and second memory banks which corresponds to said first address; and
   said de-interleaved signal is read out of any one of said first and second memory banks which corresponds to said second address.

10. A receiver in accordance with claim 9, wherein said memory means comprises a random access memory.

11. A receiver in accordance with claim 9, wherein said interleave block has a length of $N \times L$ where L is a length which constitutes one frame of said input data at said basic bit rate, each of said first and second address outputting means comprising an N-bit counter and an L-bit counter.

12. A receiver in accordance with claim 9, wherein said selecting means comprises a T-type flip-flop and inverter.

13. A paging system comprising:
means for interleaving a paging signal having a bit rate of $N \cdot R$ where N is a positive integer representative of the amount of interleaving and R is a basic bit rate and transmitting the N-degree interleaved paging signal, the amount of de-interleaving being equal to N; and
deciding means for deciding whether or not said de-interleaved signal includes a desired paging signal.

14. A system in accordance with claim 13, further comprising means for producing an audible alarm in response to an output of said deciding means which shows that said de-interleaved signal includes said desired paging signal.

15. A paging receiver for receiving and demodulating a digital modulated signal and, when detected, a paging signal of said receiver within a demodulated signal producing an annunciating signal, comprising:
means for indicating a bit rate $N \cdot R$ of a signal transmission, where N is a positive integer representative of the amount of interleaving of said demodulated signal and R, a basic bit rate; and
means for de-interleaving said demodulated signal in response to said bit rate which is indicated by said bit rate indicating means, the amount of de-interleaving being equal to N.

16. A method of transmitting and receiving a paging signal, comprising the steps of:
interleaving a paging signal whose bit rate is $N \cdot R$ where N is a positive integer representative of the amount of interleaving of said demodulated signal and R is a basic bit rate, the amount of de-interleaving being equal to N;
transmitting the interleaved paging signal;
de-interleaving the transmitted paging signal to produce a de-interleaved signal, the amount of de-interleaving being equal to N; and
deciding whether or not said de-interleaved signal includes a desired paging signal.

17. A method in accordance with claim 16, further comprising the step of generating an audible alarm when it is decided that said de-interleaved signal includes said desired paging signal.

18. A method of receiving a paging signal, comprising the steps of:
receiving a signal whose bit rate is $N \cdot R$ where N is a positive integer representative of the amount of interleaving and R is a basic bit rate;
de-interleaving the received signal to produce a de-interleaved signal, the amount of de-interleaving being equal to N; and
deciding whether or not said de-interleaved signal includes a desired paging signal.

19. A method in accordance with claim 18, further comprising the step of producing an audible alarm when said de-interleaved signal includes said desired paging signal.

* * * * *